April 1, 1969  A. DEVIENNE  3,435,875
PNEUMATIC TIRES
Filed May 18, 1966
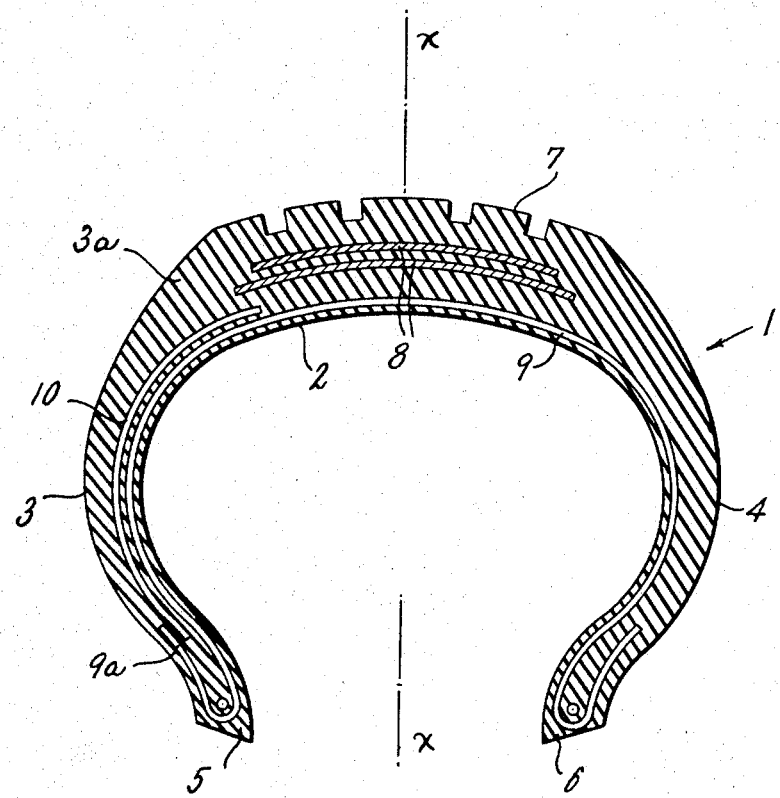
INVENTOR.
ANDRÉ DEVIENNE
BY Norbert P. Holler
ATTORNEY ' # United States Patent Office 3,435,875
Patented Apr. 1, 1969

3,435,875
PNEUMATIC TIRES
André Devienne, Compiegne, France, assignor to Societe Francaise du Pneu Englebert, Margny-les-Compiegne, France, a corporation of France
Filed May 18, 1966, Ser. No. 551,004
Claims priority, application France, June 1, 1965, 19,082
Int. Cl. B60c 5/00, 9/00, 11/00
U.S. Cl. 152—356     12 Claims

ABSTRACT OF THE DISCLOSURE

An asymmetric radial ply pneumatic vehicle tire with increased strength and resistance to curbing shocks and similar impacts in one of its sidewalls. The asymmetry is provided by a greater number of reinforcing plies in one lateral region of the carcass structure than in the other, specifically the region which underlies the sidewall that is to face outwardly of the vehicle when the tire is mounted thereon, and the outermost or supplementary reinforcing ply extends from the respective bead region to at least the corresponding proximate shoulder region of the tread but not further than the edge of the breaker in the remote shoulder region of the tread.

---

This invention relates to pneumatic tires for vehicles, and more particularly to the type of tires generally called "radial" or "radial ply" tires.

The expressions "radial tires" and "radial ply tires" as commonly used in the pneumatic tire art may be said to include various tire constructions having one or more body plies of weftless fabric extending from bead to bead wherein the respective cords in each ply are oriented substantially radially of the tire, i.e. the cords are oriented substantially normal to the beads and the crown centerline of the tire. In a monopoly radial tire construction, the cords usually have a 90° bias angle, i.e. in the unshaped carcass they extend substantially perpendicular to the planes of the beads. In a two-ply radial tire construction, the cords in each body ply are usually oriented at oppositely disposed small angles of up to about 10° with respect to the perpendicular to the bead planes, and the respective body plies thus are said to have oppositely disposed bias angles of about 80° or more (but less than 90°). In a four-ply or heavier radial tire construction, similar opposed orientation of the cords in successive body plies is employed. All of these body or carcass constructions are contemplated within the scope and meaning of the term "radial" or "substantially radial" as applied to tires herein.

The present invention stems from the realization that, as is well known, in a radial ply tire wherein the carcass is reinforced by juxtaposed textile or metal cords or cables arranged in arches extending from one bead to the other and substantially perpendicularly to the median equatorial plane of the tire, the number of reinforcing plies in the carcass is directly related to or establishes the dynamic strength of the tire in service. There is an optimum relation, of course, since too many plies would cause an undue build-up of heat during service, while too few plies would leave the tire insufficiently strong. Such tires give very good results in service and experience has provided ample proof of their high quality. Nevertheless, under certain exceptional conditions of use, for example in driving on bad roads or over unpaved trails, it has been found that radial ply tires tend to have a lower resistance to shocks or impacts resulting from the tires engaging curbs or ridges than the so-called conventional tires the carcasses of which are reinforced by a plurality of crossed or bias-cut plies in each of which the cords are oriented at considerably smaller angles than 80° to the median equatorial plane of the tire.

The proposal to remedy this deficiency by multiplying the number of plies of the radial tire carcass, with a view to improving the strength of the tire, is not fully acceptable to the tire industry, however. Such a procedure is not only costly and conducive to the manufacture of tires with less than optimum physical characteristics, as pointed out above, but also is illogical since it has observed that the destruction of tires used under the aforesaid special conditions, i.e. on bad roads, results most frequently from the deterioration of the sidewall of the tire disposed outwardly of the vehicle from the repeated subjecting of such sidewall to shocks and impacts at curbing.

It is an object of the present invention, therefore, to provide a novel radial ply tire construction which is designed to overcome the aforesaid disadvantages of known tires of this type.

Another object of the present invention is the provision of such a radial ply tire in which the carcass is provided with an asymmetrical construction so as to provide greater strength in that sidewall of the tire intended to be the outer sidewall.

More specifically, therefore, it is an object of the present invention to provide such a radial ply tire which includes a greater number of reinforcement plies in the sidewall intended to be located at the outside of the vehicle than in the opposite sidewall.

Generally speaking, the supplementary reinforcing ply or plies according to the present invention may be constituted by rubberized tire fabrics wherein the cord or cable elements may be in the form of metallic wires or glass filaments, or may be made of twisted strands of nylon, polyester, and like filaments, or even of untwisted monofilamemnts. The use of nylon cords in such a supplementary reinforcing member would appear to be of particularly great advantage by virtue of the well known resistance of nylon cords to shocks and impacts, especially when it is desired to counteract the blows to which a tire is subjected upon being impacted against the curb of a sidewalk or the like.

In actual practice, it has been found that the so-provided structural asymmetry of a radial ply tire does not affect its general behavior adversely and instead has a tendency to reduce the vibrations caused by the breaker belt of the tire in passing over small obstacles, while at the same time the lateral stability of the tire is also improved.

The cord elements constituting such a supplementary reinforcing ply of a radial tire carcass can be oriented at an angle ranging between 45° (negative or positive) and 90° relative to the median equatorial plane of the tire.

The foregoing and other objects, characteristics and advantages of the tire construction according to the present invention will be more clearly understood from the following detailed description thereof when read in conjunction with the accompanying drawing, wherein the sole figure is a schematic transverse or radial cross-sectional view of a tire embodying the principles of the present invention.

As can be seen from the drawing, the tire 1 according to the present invention comprises a carcass 2, sidewalls 3 and 4 terminating at their radially inwardmost ends in beads 5 and 6, respectively, a tread 7 surrounding the crown portion of the tire, and a breaker band or belt 8 interposed between the carcass and the tread to reinforce the latter. As is well known, the breaker 8 may be either a single ply structure or may be composed of two or more alternatingly crossed piles of metallic and/or non-metallic cords or cables. The carcass 2, as previously explained, comprises a main reinforcing structure composed of at least one radial ply 9 extending from one bead to the other, with the individual cords or cables in such ply or plies extending at an angle of between about 80 and 90° to the median equatorial plane x—x of the tire.

In accordance with the present invention, the tire 1 is further provided in its outer sidewall 3, i.e. in the sidewall of the tire which will preferably be marked or otherwise designated as being intended to be disposed toward the outside of the vehicle when the tire is in use, with a supplementary reinforcing ply 10 of rubberized tire fabric, preferably constituted by cord or cable elements oriented either substantially radially (as that term has been defined herein), i.e. substantially normal to the median equatorial plane x—x of the tire, or at somewhat smaller angles up to about 45° to said plane. The cords or cables of the reinforcing ply 10 may be made of conventional tire cord materials such as cotton, rayon, metallic wires, glass filaments, nylon, polyester, and the like, of which nylon is preferred due to its superior shock or impact resistance properties. It will be understood, of course, that the supplementary ply 10 need not have the parallel cord or cable elements characterizing standard tire cord fabrics, but may be constituted by wires or filaments, which may be either oriented or non-oriented, embedded in a covering mass of rubber.

The supplementary reinforcing ply may extend through the outer sidewall 3 of the tire from the vicinity of the bead turn-up portion 9a of the main reinforcing ply 9 to the region of the outer shoulder 3a of the tire just below the respective end of the breaker or belt 8, but it will be understood that the supplementary reinforcing ply 10 may be extended further so as to pass to a certain extent across the crown of the tire beneath the breaker or belt 8. It will also be understood that the bead region end of the supplementary ply 10 may extend further toward the bead 5 and may be disposed to the outside of the turn-up portion 9a of the main reinforcing ply 9 rather than as shown.

It is to be understood that the foregoing description is illustrative only, and that the tire construction disclosed herein is susceptible to a number of variations and modifications none of which involves a departure from the spirit of the present invention as defined in the hereto appended claims.

Having thus described my invention, what I claim and desire to protect by Letters Patent is:

1. In a radial ply pneumatic vehicle tire of the class having a carcass constituted by at least one main ply of substantially radially oriented tire cords, a pair of sidewalls overlying the lateral regions of and reinforced by said carcass, a respective bead at the radially innermost edge of each of said sidewalls, a tread surrounding the crown region of said carcass, and a breaker constituted by at least one ply of generally inextensible tire cords interposed between said tread and the crown region of said carcass; the improvement comprising an asymmetric structure of said carcass, the asymmetry being provided by different numbers of plies in the respective lateral regions of said carcass, the number of plies being greater in that one of said lateral regions of said carcass which is to underlie the sidewall that is to face outwardly of the vehicle when the tire is mounted thereon, at least the outermost one of said greater number of plies exending from substantially the region of the respective one of said beads to at least the corresponding proximate shoulder region of said tread but not further than the edge of said breaker in the remote shoulder region of said tread, thereby to impart to said outwardly facing sidewall an enhanced strength and resistance to curbing shocks and similar impacts.

2. In a radial ply pneumatic vehicle tire of the class having a carcass constituted by at least one main ply of substantially radially oriented tire cords, a pair of sidewalls overlying the lateral regions of and reinforced by said carcass, a respective bead at the radially innermost edge of each of said sidewalls, a tread surrounding the crown region of said carcass, and a breaker constituted by at least one ply of generally inextensible tire cords interposed between said tread and the crown region of said carcass; the improvement comprising an asymmetric structure of said carcass, the asymmetry being provided by at least one supplementary reinforcing ply of rubberized filamentary material overlying that one of said lateral regions of said carcass which is to underlie the sidewall that is to face outwardly of the vehicle when the tire is mounted thereon, said supplementary reinforcing ply extending from substantially the region of the respective one of said beads to at least the corresponding proximate shoulder region of said tread but not further than the edge of said breaker in the remote shoulder region of said tread, thereby to impart to said outwardly facing sidewall an enhanced strength and resistance to curbing shocks and similar impacts.

3. A tire according to claim 2, said filamentary material of said supplementary reinforcing ply comprising a tire cord fabric.

4. A tire according to claim 3, the cord elements of said fabric being made of nylon filaments.

5. A tire according to claim 3, the cord elements of said fabric being made of polyester filaments.

6. A tire according to claim 3, the cord elements of said fabric being made of glass filaments.

7. A tire according to claim 3, the cord elements of said fabric being made of metallic wires.

8. A tire according to claim 3, the cord elements of said fabric being twisted cables.

9. A tire according to claim 3, the cord elements of said fabric being untwisted monofilaments.

10. A tire according to claim 3, the cord elements of said fabric being oriented at an angle between 90° and ±45° to the equatorial plane of the carcass.

11. A tire according to claim 2, said filamentary material of said supplementary reinforcing ply comprising a mass of non-oriented fibers or filaments embedded in rubber.

12. A tire according to claim 2, wherein said supplementary reinforcing ply terminates substantially in the crown region of said carcass beneath said breaker.

References Cited

UNITED STATES PATENTS

| | | | |
|---|---|---|---|
| 2,498,859 | 2/1950 | Lessig | 152—355 |
| 3,231,000 | 1/1966 | Massoubre | 152—361 |

FOREIGN PATENTS

| | | |
|---|---|---|
| 377,211 | 6/1964 | Switzerland. |

ARTHUR L. LA POINT, *Primary Examiner.*

CHARLES B. LYON, *Assistant Examiner.*